Dec. 8, 1936.  J. C. SCHELLIN  2,063,699

VALVE CONSTRUCTION

Filed Dec. 22, 1934   2 Sheets-Sheet 1

Inventor
J. C. Schellin
Attorneys

Dec. 8, 1936.   J. C. SCHELLIN   2,063,699
VALVE CONSTRUCTION
Filed Dec. 22, 1934   2 Sheets-Sheet 2

Inventor
J. C. Schellin
By Pease and Bishop
Attorneys

Patented Dec. 8, 1936

2,063,699

UNITED STATES PATENT OFFICE 2,063,699

VALVE CONSTRUCTION

John C. Schellin, Wooster, Ohio, assignor to Akron Brass Manufacturing Company, Incorporated, Wooster, Ohio, a corporation of Ohio Application December 22, 1934, Serial No. 758,789

3 Claims. (Cl. 251—103)

The invention relates generally to valves for many and various uses, and more particularly to rotary valve construction employing resilient means adapted to seal the valve orifices when the valve is under pressure.

The present invention is particularly adapted for use in connection with water lines, and may include various types of nozzles, shut-offs, faucets and other fittings, such as are used on pipe or hose lines and in the plumbing art generally.

In various prior valve constructions in common use, a washer or a gasket of resilient material acts as the valve or valve seat, and is subjected to a severe abrasive screwing action in operation, or the valve seat is relatively sharp or pointed and therefore particularly susceptible to wear, or the resilient gasket is subjected directly to the abrasive action of granular or comminuted material in the pressure fluid flowing through the valve. Consequently, the resilient washer or gasket is relatively short-lived and must be frequently replaced.

These prior constructions are very often difficult and/or somewhat expensive to make due to their relatively complicated design, which design is the outcome of the endeavor to overcome the above difficulties.

Accordingly, it is an object of the present invention to provide an improved valve construction having resilient sealing means which is not subjected directly to the abrasive action of the pressure fluid flowing therethrough.

Another object is to provide an improved valve construction having resilient means which is acted upon by the pressure in the line to seal the valve in closed position.

A further object is to provide an improved valve construction having resilient means providing a valve seat of relatively large area.

Another object is to provide an improved valve construction in which the resilient valve sealing means is subjected only to sliding surface contact with the valve or the valve casing.

A still further object is to provide an improved valve construction having resilient means providing both a seal for the valve orifice and a seal between the valve operating means and the casing.

And finally, it is an object of the present invention to incorporate all of the foregoing advantages in a simple and compact construction which is practical and economical from a manufacturing standpoint as well as from an operating standpoint.

These and other objects are attained by the parts, combinations and improvements comprising the present invention, preferred embodiments of which are illustrated in the accompanying drawings and defined in the appended claims.

The invention may be stated in general terms as including a valve casing having an inlet port and an outlet port, a valve rotatable in the casing between the ports, valve operating means at one side of the casing, and resilient means forming a pressure seal between the valve in closed position and the casing at the outlet port, said resilient means in certain of the preferred embodiments forming a seal between the casing and the valve operating means.

Referring to the drawings forming part hereof

Similar numerals refer to similar parts throughout the drawings.

Figure 1:
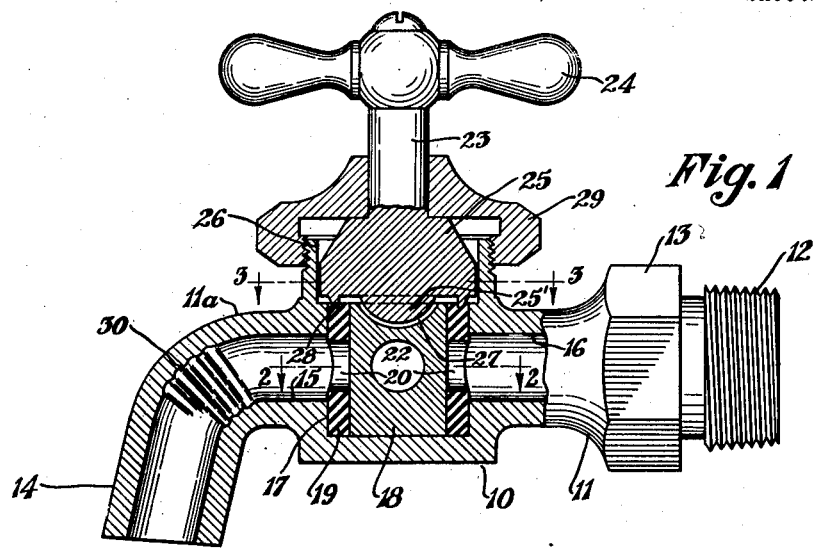
Figure 1 is a sectional view of a preferred form of a faucet valve embodying the present improvements, showing the valve in closed position.

While all of the preferred embodiments of my invention shown in the drawings are forms of faucet valves, the present improvements may be incorporated in various other types and forms of valves and the like, without departing from the scope of the invention as defined in the appended claims.

Figures 2, 3:
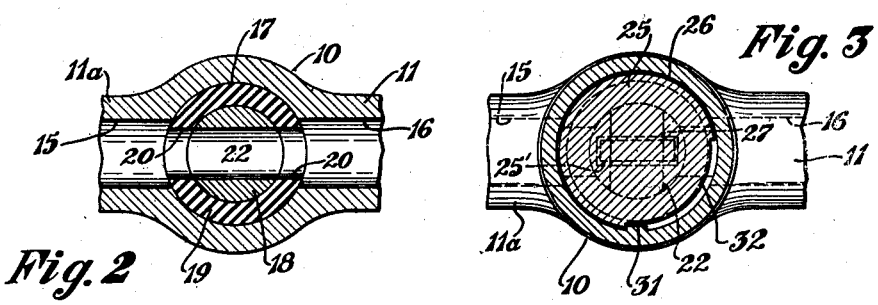
Fig. 2 is a fragmentary cross sectional view thereof as on line 2—2, Fig. 1, showing the valve in open position.
Fig. 3 is a fragmentary cross sectional view thereof as on line 3—3, Fig. 1.

The preferred embodiment of faucet valve shown in Figs. 1, 2 and 3, preferably includes a casing indicated generally at 10 and having the inlet portion 11 provided with threads 12 at its outer end for screwing into a pipe line or the like, and has the usual hex portion 13 for being engaged by a suitable wrench.

The casing 10 has at its other end an outlet portion 11a provided with a discharge spout 14 and having the usual outlet port or passage 15. The inlet portion 11 is provided with an inlet port or passage 16.

The casing is provided with a tubular valve chamber 17, which in this case is cylindrical, and the valve chamber 17 is disposed transversely of and communicates with the outlet and inlet ports 15 and 16, which ports are in longitudinal alignment in the casing 10.

A cylindrical valve 18 is located within the valve chamber 17 and is rotatable about the axis of said chamber. A tubular resilient sleeve 19 of rubber or the like is mounted in the valve chamber between the valve 18 and the chamber walls, and in this embodiment the sleeve 19 is cylindrical and secured to the chamber walls as by vulcanizing and the like. The inner surface of the sleeve 19 is cylindric and substantially conforms to the outer cylindrical surface of the valve 18 so that the valve slidably contacts with the sleeve when rotated therein.

The sleeve 19 is provided with aligned valve orifices 20 which register with the outlet and inlet ports 15 and 16 respectively, and the area of each valve orifice 20 is materially less than the area of the port with which it registers for a purpose to be hereinafter described.

The valve 18 is provided with a through orifice 22 adapted to register with and conform to the orifices 20 when the valve is in open position.

The valve operating means preferably includes a stem 23 projecting from one end of the valve chamber 17 and having a handle 24 secured on its outer end in the usual manner. The inner end of the stem 23 is provided with an enlarged portion 25 which is rotatable within the enlarged end portion 26 of the valve chamber 17, and has a key 25' projecting therefrom which is received in a socket 27 in the valve 18 for detachably connecting the valve stem to the valve for rotating the valve.

Preferably, the inner surface of the enlarged portion 25 of the stem 23 is provided with a V-shaped annular rib 28 projecting axially inward of the valve chamber which is adapted to engage the end of the resilient sleeve 19, and when the valve closure nut 29, in which the stem is journalled, is screwed onto the casing as shown, the rib 28 is forced against the end of the sleeve 19 so as to form a tight seal between the valve casing and the valve operating means. Accordingly, it is not necessary to provide any additional packing around the valve stem or valve operating means, as is the case with the ordinary valve of this type.

The resilient sleeve 19 forms a pressure seal between the valve in closed position, as shown in Fig. 2, and the casing at the entrance to the outlet port 15, because the pressure in the line at the inlet side of the valve acts to force the valve toward the outlet side of the casing, thus forming a resilient or cushion seal between the valve and the casing.

Since the valve orifices 20 and 22 are materially less in area than the entrance end of the outlet port 15, water flowing through the orifices when the valve is in open position will have its velocity decreased as it flows from the smaller orifice into the larger outlet port. This lessens the likelihood of splashing when the stream discharging from the spout 14 strikes the wall of a receptacle.

Preferably, annular ribs 30 are provided in the walls of outlet passage 15 for further retarding the velocity of water flowing through the spout and lessening the tendency of the discharging stream to splash.

The valve construction shown in Figs. 1, 2 and 3 is designed to move from fully open to fully closed position by turning the handle 24 through 90°, and as shown in Fig. 3 a stop pin 31 is secured in or cast integral with the casing walls and operates in an arcuate recess 32 provided in the enlarged portion 25 of the stem for limiting the rotary movement of the valve.

The resilient sleeve 19 is not subjected directly to the abrasive action of fluid flowing through the valve, and provides a valve seat or seal of relatively large area. Moreover, the valve sleeve 19 is subjected only to a sliding surface contact with the valve and not to any screwing or otherwise abrasive action which would cause rapid or undue wear.

Obviously, the resilient sleeve 19 may be made to adhere to the outer surface of the valve 18 as by vulcanizing, and adapted to slidably contact the inner surface of the valve chamber walls as the valve rotates, without departing from the scope of the invention as defined in the claims.

Also, the cross sectional shape of the valve chamber 17 may be varied to a polygonal form, for example, and the outer cross sectional shape of the sleeve 19 made to conform thereto, the inner surface of the sleeve being adapted to slidably contact with the outer surface of the valve as the valve rotates, without departing from the scope of the invention as defined in the claims.

Figures 4, 5:
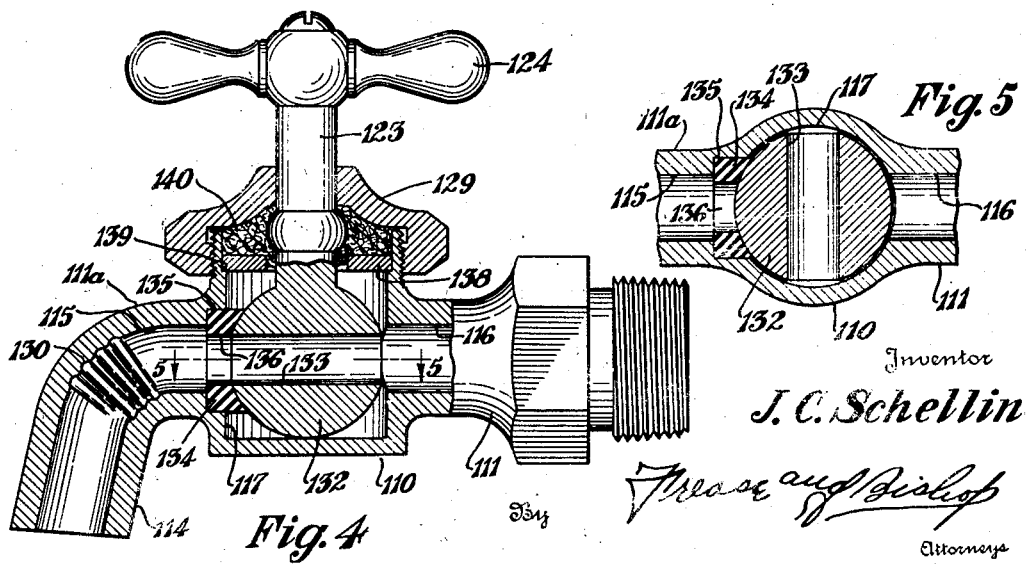
Fig. 4 is a sectional view of another preferred form of faucet valve embodying certain of the present improvements, and showing the valve in open position.
Fig. 5 is a fragmentary cross sectional view thereof, as on line 5—5, Fig. 4, showing the valve in closed position.

The embodiment of faucet valve shown in Figs. 4 and 5 preferably includes the casing indicated generally at 110 having the inlet portion 111 and the outlet or discharge portion 111a provided with the spout 114. The inlet portion 111 is provided with the inlet port 116 and the outlet portion 111a is provided with the outlet port 115 longitudinally aligned therewith.

The casing 110 is provided with a tubular valve chamber 117 which is preferably cylindrical, and the valve chamber is disposed transversely of and communicates with the outlet and inlet ports 115 and 116.

A valve 132, which in this embodiment is preferably spherical, is rotatable between the ports upon the axis of the valve chamber and is provided with a through orifice 133 which is adapted to align and register with the outlet and inlet ports 115 and 116 respectively, in open position. The resilient means for forming a pressure seal between the valve in closed position and the casing at the entrance to the outlet port in this embodiment, preferably includes a rubber or otherwise resilient washer or gasket 134 which fits in a socket 135 provided in the casing wall at and preferably concentric with the outlet port 115.

The orifice 136 in the gasket 134 is adapted to register and conform with the through orifice 133 in the valve, and the area of the orifices 133 and 136 is preferably materially less than the area of the entrance end of the outlet port 115 for reducing the velocity of water flowing therethrough.

When the valve is in closed position as shown in Figure 5 the pressure at the inlet side forces the valve against the gasket 134 to form a pressure seal or seat between the valve and casing. Annular ribs 130 may be provided in the outlet passage 115 for retarding the flow of the discharging stream to lessen the tendency of splashing thereof.

The valve 132 is provided with a preferably cylindrical stem 123 projecting from one end of the valve chamber 117 and having a handle 124 secured on its outer end, in the usual manner, for operating the valve. The valve stem 123 is journalled in the usual manner in a closure nut member 129 which is screwed on the end of the valve chamber casing as shown, and a preferably metal washer 138 surrounds the stem under the nut and abuts a shoulder 139 provided within the end of the valve chamber 117. The usual packing material 140 may be provided between the washer 138 and the closure member 129 for providing a seal between the valve stem and the casing.

In this embodiment the resilient sealing means comprises the single replaceable gasket or washer 134 which is not subjected to the direct abrasive action of the fluid, and which presents a relatively large area to be slidably contacted by the spherical surface of the valve. The valve is easily assembled and the gasket 134 is quickly and easily replaced as may be required.

Figure 6:
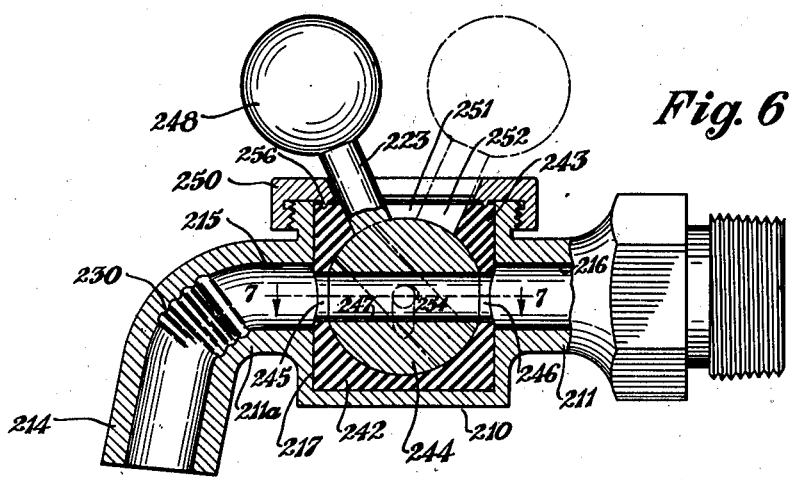
Fig. 6 is a sectional view of another preferred form of faucet valve embodying the present improvements and showing the open and closed positions of the valve.
Figure 7:
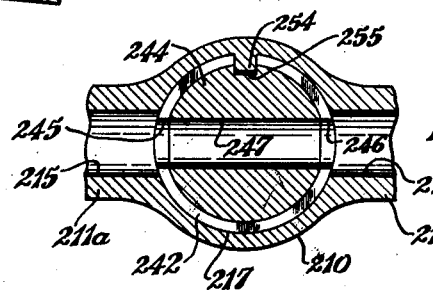
Fig. 7 is a fragmentary cross sectional view thereof as on line 7—7, Fig. 6.

The embodiment of faucet valve shown in Figs. 6 and 7 preferably includes the casing indicated generally at 210 having the inlet portion 211, and the outlet portion 211a which is provided with the discharge spout 214 having annular ribs 230 therein. The casing is provided with a tubular valve chamber 217 disposed transversely of and communicating with the aligned outlet and inlet ports 215 and 216 respectively.

The resilient sealing means in this embodiment preferably includes two cup-shaped sleeve members of rubber and the like, one cup-shaped member 242 fitting in the lower half of the valve chamber 217, that is, against the closed end of the valve chamber, and the other cup-shaped member 243 fitting in the upper half or open end of the valve chamber. The cup-shaped members 242 and 243 are provided with inner spherical surfaces, and are adapted to abut each other to provide a spherical valve compartment in which the spherical valve 244 is positioned with a close sliding fit.

The cup-shaped members 242 and 243 are provided with oppositely disposed aligned semi-circular valve orifices, so that when assembled in the valve chamber 217 they form circular valve orifices 245 and 246 which register with the outlet and inlet ports 215 and 216 respectively. The valve 244 is provided with a through orifice 247 which is adapted to register with and conform to the orifices 245 and 246 when the valve is in open position, as shown in full lines in Fig. 6.

A valve stem 223 projects outwardly from one end of the valve chamber 217 and may be secured to or made integral with the valve 244. The valve stem 223 has on its outer end a ball 248 for operating the valve 244.

A closure cap 250 is provided at the open end of the valve chamber 217 and adapted to be screwed onto the walls thereof as shown, and the cap 250 is provided with a slot 251 through which the valve stem extends. A slot 252 is provided in the upper cup-shaped member 243, through which slot the valve stem extends, and the slot 252 registers with the slot 251 in the cap, the ends of the slot acting as stops to limit the movement of the valve.

A pivot pin or lug 254 is secured in or made integral with the casing wall of the valve chamber 217 and projects inwardly therefrom. The lug 254 is pivotally received or journalled in the closed upper end of a vertical slot 255 provided in the valve, the lower end of the slot being open so that the valve may be inserted downwardly in the valve chamber until lug 254 engages the top of the slot. The valve 244 may then be rotated on a transverse axis perpendicular to the axis of the valve chamber 217 from open to closed position as shown by the dot-dash lines in Fig. 6.

Preferably, the underside of the closure cap 250 is provided with a V-shaped inwardly projecting annular rib 256 for engaging the top surface of the cup-shaped member 243 to form a seal between the casing and the closure cap, and the valve 244 maintains such a close sliding fit with the inner spherical surfaces of the resilient cup-shaped members as to prevent any leakage between the contacting surfaces of the valve and cup-shaped members and out through the slots 251 and 252. Accordingly, no extra packing is required to seal the valve in this embodiment.

Due to the relatively small amount of movement of the valve stem 223, when the valve is turned from closed to open position, the full force of the stream of water is turned on relatively suddenly so that the decrease of velocity of the stream in passing from orifice 245 to port 215 and the retardation of the stream by the ribs 230 become all the more important in order to lessen the tendency of the discharging stream toward splashing.

Figure 8:
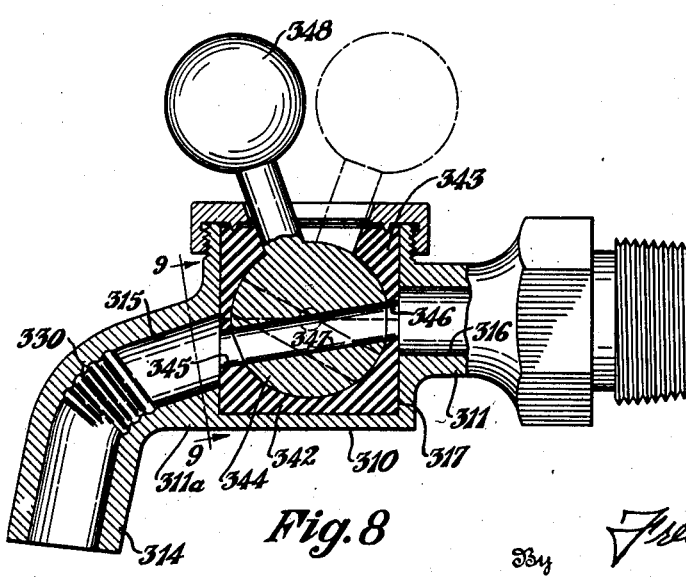
Fig. 8 is a sectional view of a modification of the valve shown in Fig. 6.

The embodiment shown in Fig. 8 is a slightly modified form of the valve shown in Fig. 6, and illustrates the adaptation of the valve to a construction wherein the inlet and outlet ports are not in longitudinal alignment, and wherein a shorter movement of the valve handle is desired without reducing the area of the through orifice in the valve which would cut down the volume of flow therethrough.

The embodiment in Fig. 8 includes the casing indicated generally at 310 having the inlet portion 311, outlet portion 311a and discharge spout 314 which is provided with annular ribs 330 therein. The inlet portion 311 is provided with the inlet port 316 communicating with the valve chamber 317, and the outlet portion 311a is provided with the outlet port 315 which is angularly disposed to the inlet port 316 and which communicates with the valve chamber at a point below the axis of the inlet port.

Figure 9:
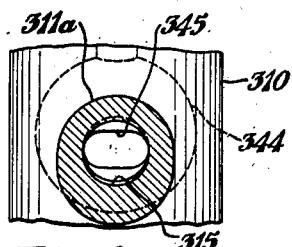
Fig. 9 is a fragmentary cross sectional view as on line 9—9, Fig. 8.

The cup-shaped members 342 and 343 are formed and positioned in the valve chamber in the same manner as in the valve construction shown in Fig. 6, with the exception that the orifices 345 and 346 are made to register with the angularly disposed outlet and inlet ports respectively, and the orifices 345 and 346 are made to have a substantially elliptical cross section as best shown in Fig. 9. The through orifice 347 in the valve 344 is made to register with and conform to the orifices 345 and 346 when the valve is in open position, so that the orifice 347 does not pass through the axial center of the valve.

The orifices 345 and 346 are disposed so that their short axes lie in the vertical plane of the axial center of the valve 344 and the axes of the ports 315 and 316, so that as the valve 344 rotates the short dimension of the through orifice 347 moves across the short dimension of the sleeve orifices so that the ball handle 348 traverses a shorter path in moving the valve from open to closed position.

Obviously, in the embodiments of Figs. 6 and 8, the cup-shaped sleeve members could be made of metal and a resilient cover applied to the valve for permitting rotation of the valve within the cup-shaped members and providing a seal between the valve and the casing, although in this case additional packing might be required for the valve operating means.

In all of the embodiments of my improved valve construction herein shown and/or described, the resilient sealing means has a close sliding fit with either the valve or the casing so as to provide a pressure seal when the valve is closed, and the water flowing through the valve acts as a lubricant between the metal of the valve or casing and the sealing means, so as to permit easy operation of the valve. Because of the lubricating effect of the water flowing through the valve the cup-shaped members in the constructions of Fig. 6 and Fig. 8 will permit rotation of the valve therein and at the same time seal the valve around the valve operating means.

I claim:

1. Valve construction including a casing having an inlet port and an outlet port, walls forming a tubular valve chamber disposed transversely between and communicating with the ports, a cylindrical valve rotatable within the chamber about the axis of the chamber, valve operating means connected to the valve at one end of said chamber, and a resilient sleeve located between the valve and the valve chamber and having an inner cylindric surface substantially conforming to the outer cylindric surface of the valve, and the valve operating means being adapted to seal against the adjacent end of said resilient sleeve.

2. Valve construction including a casing having an inlet port and an outlet port, walls forming a tubular valve chamber disposed transversely between and communicating with the ports, a cylindrical valve rotatable within the chamber about the axis thereof, valve operating means connected to the valve at one end of the chamber, and a resilient sleeve around the valve secured to the inner walls of the chamber, said sleeve having an inner surface substantially conforming to and slidably contacting with the outer cylindric surface of the valve, and one end of said resilient sleeve forming a seal with the valve operating means.

3. Valve construction including a casing having an inlet port and an outlet port, walls forming a tubular valve chamber disposed transversely between and communicating with the ports, a valve rotatable within the chamber about the axis thereof, valve operating means connected to the valve at one end of said chamber, and a resilient sleeve located between the valve and the valve chamber and having an inner surface substantially conforming to the outer surface of the valve, and the valve operating means being adapted to seal against the adjacent end of said resilient sleeve.

JOHN C. SCHELLIN.